Feb. 9, 1960   B. E. LENEHAN   2,924,805
ADJUSTABLE METER SOCKET
Filed March 30, 1954   2 Sheets-Sheet 2
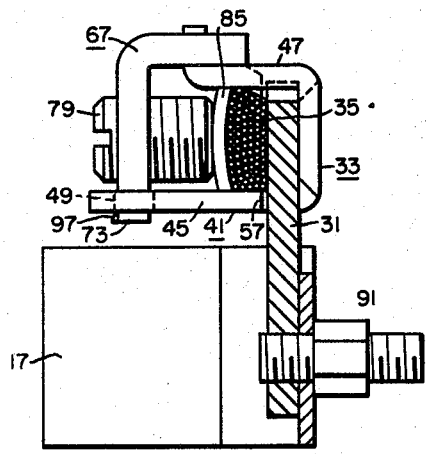
Fig. 5.
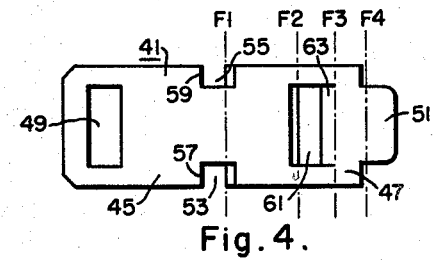
Fig. 4.
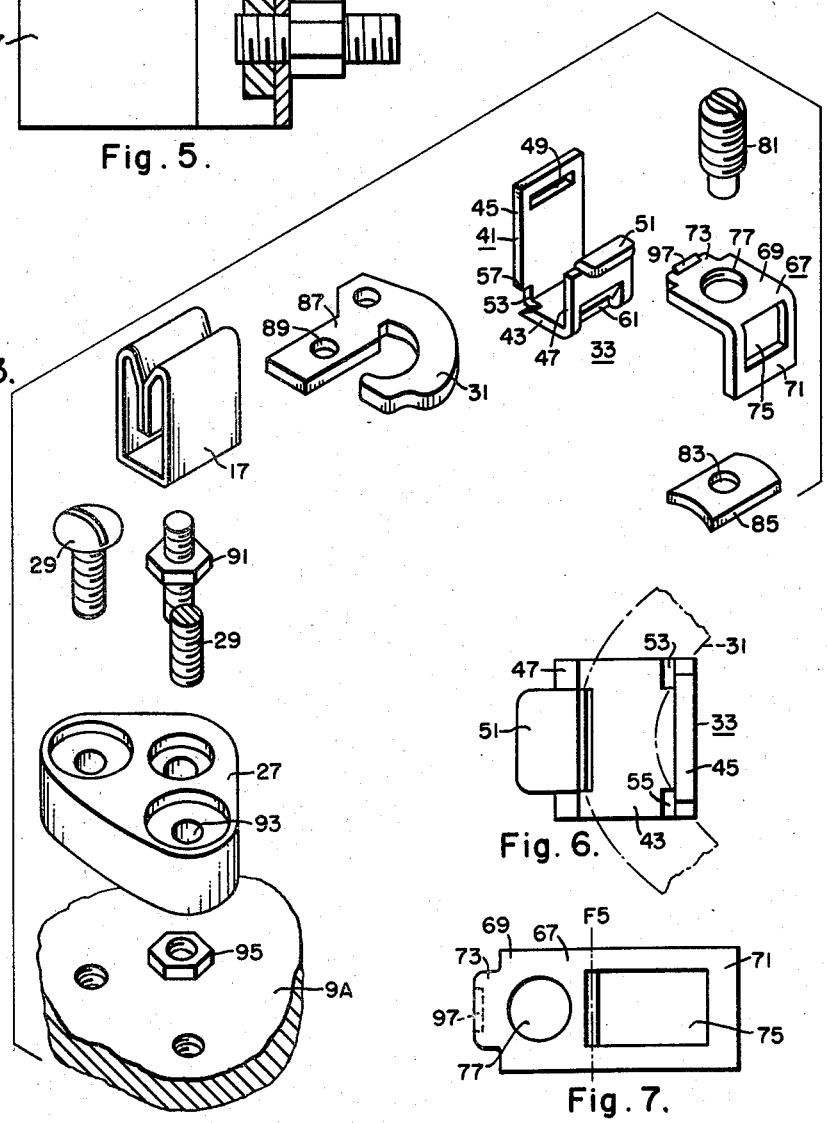
Fig. 3.
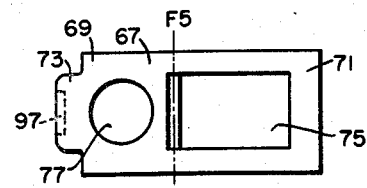
Fig. 7.
Fig. 6.

Feb. 9, 1960     B. E. LENEHAN     2,924,805
ADJUSTABLE METER SOCKET

Filed March 30, 1954     2 Sheets-Sheet 1

United States Patent Office 2,924,805
Patented Feb. 9, 1960

2,924,805
ADJUSTABLE METER SOCKET

Bernard E. Lenehan, Bloomfield, N.J., assignor to Westinghouse Electric Corporation, East Pittsburgh, Pa., a corporation of Pennsylvania Application March 30, 1954, Serial No. 419,810

8 Claims. (Cl. 339—31)

This invention relates to connection devices and it has particular relation to sockets for detachable instruments having contact jaws and terminals associated with the contact jaws.

One of the most widely employed procedures for establishing connections between an electrical instrument such as a watt-hour meter and conductors is through the utilization of contact jaws and contact blades to provide a detachable mounting for such an instrument. In a detachable mounting the instrument has contact blades associated therewith through which connections are to be made to the instrument. The instrument is mounted on a socket which has contact jaws positioned to receive the contact blades of the instrument. A socket for a detachable instrument may be in the form of a square or rectangular box or trough or it may be of round configuration. A typical example of a detachable watt-hour meter associated with a socket will be found in the Bradshaw et al. Patent 1,969,499.

Because of the heavy conductors frequently required for sockets and because of the limited space available within such sockets, the connection of conductors to contact jaws in sockets has been extremely difficult.

In accordance with the invention, terminals employed for establishing electrical connections between conductors and electrical equipment are movable into alinement with the electrical conductors which they are to receive. In a preferred embodiment of the invention, a terminal has an open-channel receiver which is held captive on a guide element for movement into alinement with an associated conductor. After a conductor has been placed in the receiver the invention further provides a removable bridge having a clamp for securing the conductor to the associated guide element.

The invention further contemplates the provision of a socket with the aforesaid terminals movable about axes permitting the utilization of the same jaw and terminal assemblies for both vertical and horizontal mounting of the socket.

It is therefore an object of the invention to provide an improved alineable terminal assembly for receiving an electrical conductor.

It is a further object of the invention to provide an improved connector assembly including a contact jaw and an associated adjustable terminal.

It is also an object of the invention to provide an improved socket for detachable instruments having contact jaws and an alineable terminal assembly associated with each of the contact jaws.

It is an additional object of the invention to provide an improved socket for detachable electrical instruments designed for vertical or horizontal mounting and having contact jaws and adjustable terminal assemblies which are adjustable for either vertical or horizontal mounting of the socket.

Other objects of the invention will be apparent from the following description taken in conjunction with the accompanying drawings in which:

Fig. 3 is an exploded view in perspective with parts broken away illustrating a contact jaw and terminal assembly employed in the socket of Fig. 1;

Fig. 4 is a view in plan showing a development of a terminal receiver employed in the socket of Fig. 1;

Fig. 5 is a view in sectional elevation showing a contact jaw and terminal assembly employed in the socket of Fig. 1;

Fig. 6 is a view in front plan showing a terminal receiver employed in the socket of Fig. 1; and Fig. 7 is a view in plan showing a development of a bridge employed in a terminal assembly of Fig. 1.

Figure 1:
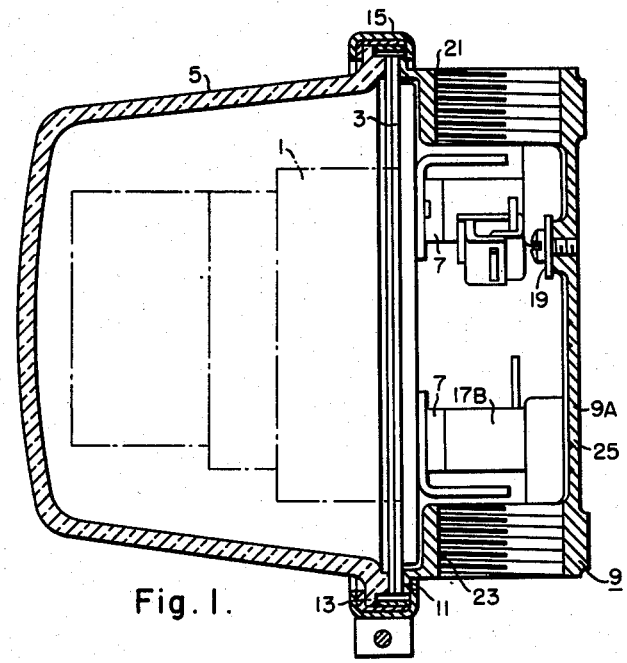
Figure 1 is a view in sectional elevation of a detachable electrical instrument mounted on a socket.

Referring to the drawings, Fig. 1 shows a detachable instrument assembly which includes a detachable instrument 1 such as a watt-hour meter which is mounted on a suitable base 3. The base 3 has a circular periphery and has associated therewith a cover 5 for the purpose of defining an enclosure for the instrument 1. A plurality of contact blades 7 pass through the base 3 for the purpose of establishing electrical connections between the instrument 1 and an external circuit.

The enclosure containing the instrument 1 is mounted on a socket enclosure 9 having a circular seat or flange 11 defining an opening into which the contact blades 7 extend. It will be noted that the seat or flange 11 is alined with a flange 13 of the cover 5 and that the flanges are engaged by a conventional sealing ring 15. This association of a detachable instrument with a socket is set forth in greater detail in the aforesaid Bradshaw et al. patent.

Figure 2:
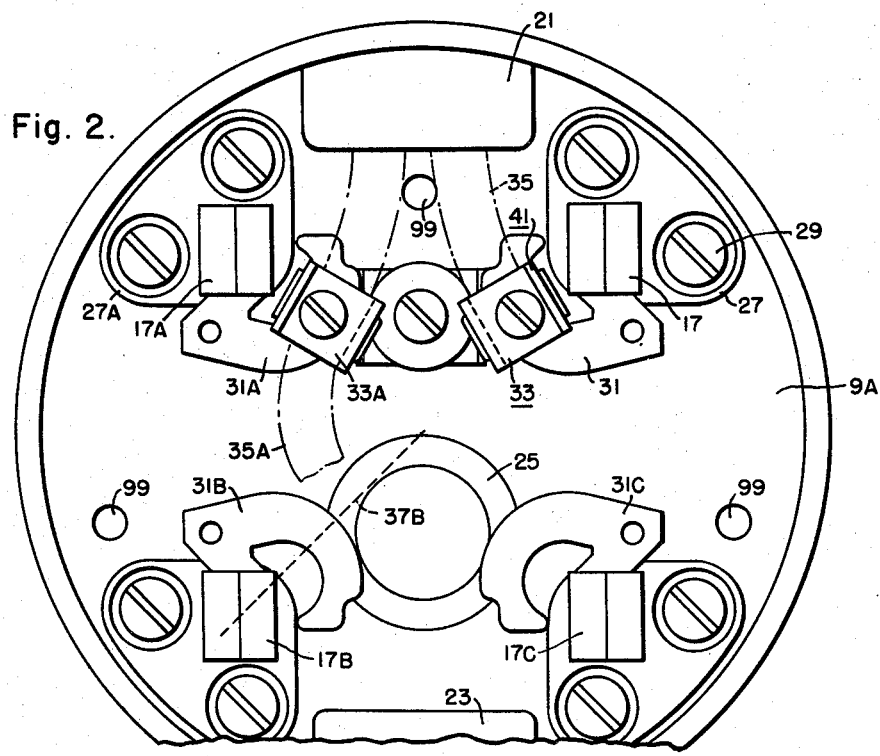
Fig. 2 is a view in front plan of the socket illustrated in Fig. 1.

The socket enclosure 9 contains a number of contact jaws for receiving the contact blades of the electrical instrument. The number of contact jaws required depends on the particular instrument involved. For present purposes it will be assumed that four contact jaws 17, 17A, 17B and 17C are required as shown in Fig. 2. The socket enclosure 9 also has a ground screw or terminal 19 secured to its rear wall 9A for the purpose of receiving a ground conductor.

Conductors are introduced into the socket enclosure 9 through suitable openings. To this end hubs 21 and 23 are provided for receiving the threaded ends of conduit pipe through which conductors are introduced into the socket enclosure. The hubs in Fig. 1 are illustrated as extending into the interior of the socket enclosure. However, if additional wiring space is desired, the hubs may be placed on the outside of the socket in a conventional manner.

If desired, portions of the wall of the socket enclosure may be weakened by score lines to provide knockouts through which conductors may be introduced into the socket enclosure. A knockout 25 of this type is illustrated. The socket enclosure 9 may be constructed in any suitable manner as by die-casting an aluminum alloy into the desired shape or it may be fabricated from a material such as steel.

Each of the contact jaws is secured to the socket enclosure and is provided with a terminal assembly. Inasmuch as the components employed for securing each of the contact jaws to the socket enclosure and the terminal assembly for each of the contact jaws are substantially similar for each of the contact jaws, it will suffice to describe these components with particular reference to those associated with the contact jaw 17. Similar components for the contact jaws 17A, 17B and 17C will be identified by the same reference character employed for the corresponding component associated with the contact jaw 17 followed by the identifying suffix A, B or C respectively.

The contact jaws could all be mounted on a common insulator which is secured to the socket enclosure. Alternatively a pair of contact jaws could be mounted on the insulator. For example, the contact jaws 17 and 17C may be mounted on a common insulator secured to the socket enclosure. In a similar manner the contact jaws 17A and 17B could be mounted on a separate insulator secured to the socket enclosure.

In the embodiment of the invention illustrated in the drawings, each contact jaw is secured to an individual insulator. Thus the contact jaw 17 is secured to an insulator 27 which in turn is detachably secured to the rear wall 9A of the socket enclosure by machine screws 29. By inspection of Fig. 2 it will be noted that the insulator occupies less than one-fourth the area of the rear wall 9A.

The orientation of each contact jaw with respect to its associated insulator depends on the type of mounting required. In Figs. 1 and 2 it is assumed that the socket is arranged for vertical mounting and the contact jaws are shown with their contact faces in vertical planes. It will be understood that for horizontal mounting of the socket enclosure the planes of the contact faces must be displaced 90° from the positions illustrated in Fig. 2, in order to position the instrument correctly for horizontal mounting of the socket enclosure.

The contact jaw 17 has associated therewith a terminal unit 33 which is movable for alinement purposes. The terminal unit 33 preferably is slidable on an arcuate guide element 31 for the purpose of permitting alinement of the guide element with a conductor introduced through one of the hubs of the socket enclosure. Such a conductor 35 is illustrated in dotted lines in Fig. 2. Terminal units are not shown for the guide elements 31B and 31C, but would be similar to the unit 33 illustrated for the guide element 31.

By inspection of Fig. 2 it will be noted that the guide element 31 provides an arcuate path which is in a plane transverse to the contact jaw faces and which is substantially symmetric with respect to a line connecting the center of the contact jaw 17 with the center of the socket enclosure. Such a line 37B is shown dotted for the contact jaw 17B. Although the arcuate path may be circular, a circular path is not essential and the path of Fig. 2 is not exactly circular, a suitable shape being clearly shown. In the embodiment of Fig. 2 the contact jaws are mounted at the four corners of a square, and the line 37B extends at 45° relative to the contact faces of the jaw 17B. The arcuate path is located between the contact jaw and the center of the socket enclosure. Because of this symmetry similar components may be employed for all other contact jaws. For example, the guide elements 31 and 31A are similar, but are reversed with respect to each other about a vertical line as viewed in Fig. 2. The arcuate path desirably extends around one corner of the associated contact jaw.

Furthermore, the same terminal assembly may be employed for both horizontal and vertical mounting of the socket enclosure. For example, let it be assumed that the contact jaws 17 and 17A together with their associated terminal assemblies are interchanged, that after such interchange the contact jaw 17 and its associated terminal assembly are rotated 90° in a counterclockwise direction, and that the contact jaw 17B and the associated terminal assembly are rotated 90° in a clockwise direction. By this sequence the contact jaws are positioned properly for horizontal mounting of the socket enclosure. The contact jaws 17B and 17C and their associated terminal assemblies may be similarly interchanged.

The interchange readily may be effected by moving the insulators with their associated contact jaws. Thus by interchanging the insulators 27 and 27A together with all of the components mounted on such insulators, the associated contact jaws 17 and 17A are properly positioned for horizontal mounting of the socket enclosure. Similar comments apply to the contact jaws 17B and 17C.

The terminal unit for each contact jaw preferably includes a U-shaped receiver held captive on the associated guide element for limited sliding movement and a bridge for the open ends of the receiver which may be removed to facilitate entry of a conductor in the receiver. A suitable bridge assembly is shown in Patent 2,088,481.

The preferred construction of the terminal unit 33 will be understood clearly by reference to Fig. 3. As shown in Fig. 3, the terminal unit includes a U-shaped receiver 41 which has a web or base 43 and two legs 45 and 47 projecting at right angles from the web 43. It will be noted that the legs are of unequal length and that the longer of the legs has a hole 49 provided adjacent its free end. The shorter of the legs has a tongue 51 which projects at right angles outwardly of the shorter leg. In addition, notches 53 and 55 are provided adjacent the lower end of the leg 45 as viewed in Fig. 3 for the purpose of defining ledges 57 and 59 which are positioned somewhat above the web 43.

The lower end of the shorter leg also is provided with a hole 61 and the leg carries a lip 63 which is spaced above the web 43.

The construction of the receiver 41 will be understood more clearly from an inspection of Fig. 4, wherein the receiver is shown in developed form. Conveniently the receiver may be constructed from a sheet of material having adequate rigidity. Preferably the material is a good electrical conductor such as a high-conductivity brass. While the material is in flat form, the notches 53 and 55, the hole 49, the hole 61, the tongue 51 and the lip 63 are defined by a suitable punching operation. Thereafter, the leg 45 is bent about a fold line F1 into the position illustrated in Fig. 3. The leg 47 is bent about the fold line F2 into the position illustrated in Fig. 3. The tongue 51 then may be bent at right angles about the fold line F4 and the lip 63 may be displaced slightly from the plane of the associated leg about its fold line F3 to provide the receiver illustrated in Fig. 3.

The receiver 41 coacts with a bridge 67 which has two legs 69 and 71 at right angles to each other. The leg 69 has a tongue 73 of reduced width proportioned for snug reception in the hole 49. The leg 71 has a slot 75 proportioned for snug reception of the tongue 51 when the bridge is in operative position.

The leg 69 of the bridge also has a threaded opening 77 for threaded reception of a screw 79. The screw 79 has an end 81 of reduced diameter for reception in a hole 83 provided in a pressure plate 85. After it is introduced in the hole, the end 81 is upset to retain the pressure plate on the screw while permitting rotation of the screw relative to the pressure plate. Although the pressure plate may be a flat or plane plate, preferably it is curved as illustrated for a purpose hereinafter pointed out.

The bridge 67 conveniently may be constructed from a flat strip of rigid material such as brass. The tongue 73 and the slot 75 may be formed by a punching operation and the ends may be bent about a fold line F5 to provide the configuration illustrated in Fig. 3. Thereafter the hole 77 may be threaded for reception of the screw 79.

The pressure plate 85 may be constructed of any suitable rigid material such as stainless steel.

The association of the parts of the terminal unit in operative position is clearly illustrated in Fig. 5. It will be noted that when the screw 79 is positioned between the legs 45 and 47, the bridge 67 cannot be removed from the receiver 41. However, by moving the screw 79 to the left as viewed in Fig. 5 sufficiently to clear the leg 47, the bridge may be readily removed from the receiver to permit the conductor 35 to be placed in the receiver or to be removed from the receiver.

The receiver 41 is designed for slidable association with the guide element 31. The shape of the guide element is clearly apparent from Figs. 2 and 3. Conveniently the guide element may be punched from a flat sheet or ribbon of material such as brass having good electrical conductivity.

The guide element 31 is so proportioned that when it is slipped over the web 43, portions of the guide element are positioned beneath the ledges 57 and 59 and beneath the lip 63. The relationship of these two components is clearly shown in Figs. 5 and 6. It will be noted that the ledges and the lip prevent movement of the receiver transverse to the plane of the guide element but permit sliding movement of the receiver along the guide element. At the same time a substantial portion of the guide element is exposed for direct engagement with the conductor 35.

Returning to Fig. 3 it will be noted that the guide element 31 has an extension 87 which is provided with a threaded opening 89 for threaded reception of one end of a double-ended screw 91. The extension 87 is proportioned for insertion within the contact jaw 17. This contact jaw is constructed in the conventional manner of springy electroconductive material and is of the conventional U-shape having reentrant ends. When the extension 87 is placed on the base of the contact jaw, it is secured thereto by means of the screw 91. With the parts assembled in this manner it will be noted that the receiver 41 is held completely captive on the guide element 31, and that it has a limited movement along the guide element for alinement purposes.

The remaining end of the screw 91 is inserted through an opening 93 in the insulator 27 and is secured to the insulator in any suitable manner as by the nut 95 which is recessed within the insulator. Finally the insulator is secured to the rear wall 9A of the socket enclosure by means of the screws 29.

It is believed that the procedure for wiring the socket enclosure will be understood from the foregoing discussion. When a conductor is to be secured to the terminal asembly 33, the screw 79 is first retracted sufficiently to permit the bridge 67 to be moved upwardly as viewed in Fig. 5 clear of the receiver 41. The receiver 41 then is moved arcuately on the guide element 31 (Fig. 2) into alinement with the conductor 35. The conductor then may be placed within the receiver wherein it is in engagement with the guide element 31.

The open receiver at this stage facilitates entry of the conductor therein. If a continuous conductor (as 35A) is to be run completely through the socket enclosure, an intermediate portion may be stripped of its insulation and laid in the receiver.

Next the bridge 67 is replaced in the position illustrated in Fig. 5 and the screw 79 is operated to force the pressure plate 85 towards the guide element 31. Such movement of the screw compresses or constricts the conductor 35 between the pressure plate, the receiver 41 and the guide element 31 to establish excellent electrical contact therewith. The curvature of the pressure plate assists in compacting the conductor.

If desired, the tip of the tongue 73 may be provided with a small projection 97 for the purpose of assisting the locking of the bridge 67 in its operative position when pressure is applied by the screw 79 to the conductor 35. It will be understood that the projection 97 is proportioned to slip through the slot 49 of the leg 45 when the bridge is free to move.

The provision of small independent insulators for the contact jaws assures maximum wiring room within the socket enclosure. In addition, if only three contact jaws are required for a detachable instrument, one of the contact jaws together with its terminal assembly and insulator may be removed for the purpose of increasing still further the available wiring space.

As shown in Fig. 2, the three holes 99 in the rear wall 9A of the socket enclosure are provided for receiving screws intended to mount the socket against the wall of a building or other suitable structure.

Although the invention has been described with reference to certain specific embodiments thereof, numerous modifications falling within the spirit and scope of the invention are possible. Consequently the drawings and descriptions herein presented are to be construed in an illustrative rather than in a limiting sense.

I claim as my invention:

1. In a connection device for a detachable electrical instrument, an electroconductive contact jaw having substantially parallel jaw faces, an arcuate electroconductive guide element disposed substantially in a plane transverse to the jaw faces, said guide element being connected to the contact jaw, and a clamping unit for clamping an electric conductor to the guide element, said clamping unit comprising a U-shaped receiver embracing the guide element and having at least a part partially overlying the guide element for preventing substantial movement of the receiver relative to the guide element in a direction transverse to said plane and for permitting sliding movement of the receiver relative to the guide element, a bridge removably engaging the open ends of said U-shaped receiver, said bridge and receiver having interlocking configurations preventing substantial movement of the bridge from the receiver in a direction transverse to said plane, and clamping means carried by the bridge for clamping to the guide element a conductor placed between the bridge and the guide element.

2. A connection device as claimed in claim 1 wherein the U-shaped receiver has legs of different length, the shorter of said legs having a tongue adjacent its free end directed away from the longer of said legs, said longer of said legs having a hole adjacent its free end extending in the direction of the tongue, said bridge having an L configuration, a first free end of the bridge having a hole for reception of said tongue and the second free end of the bridge being configured for reception in the first-named hole with the bridge in operative position to prevent substantial movement of the bridge in a direction transverse to the closed end of the U-shaped receiver while permitting releasing movement of the bridge in a direction substantially parallel to said closed end to expose the receiver for entry therein of a conductor, said clamping means comprising a screw in threaded engagement with the second free end of the bridge, said screw with the bridge in operative position being operable towards and from the closed end of the U-shaped receiver.

3. In a connection device for a detachable instrument, a contact jaw comprising a U-shaped electro-conductive member having a web and first and second legs disposed respectively in first and second substantially parallel, spaced planes, said planes being transverse substantially to said web, an arcuate guide element having a first portion fixedly connected to the web, said arcuate guide element having a second portion substantially parallel to said web extending arcuately for a substantial angular distance about the contact jaw, said second portion being spaced for a substantial distance from the contact jaw and having a free end terminating adjacent the contact jaw, and a terminal unit slidably mounted on the arcuate guide element.

4. In a connection device for a detachable instrument, a contact jaw comprising a U-shaped electroconductive member having a web and first and second legs disposed respectively in first and second substantially parallel, spaced planes, said planes being transverse substantially to said web, an arcuate guide element having a first portion disposed substantially between the planes and connected to the web, said arcuate guide element having a second portion substantially parallel to said web extending arcuately for a substantial angular distance about the contact jaw, said second portion being spaced for a substantial distance from the contact jaw and having a free end terminating adjacent the contact jaw, and a terminal unit slidably mounted in the arcuate guide element, said terminal unit comparising a loop unit linked with the arcuate guide element, the loop unit comprising a first U-shaped member and a bridge member for closing the ends of the U-shaped member to establish a loop linked with the arcuate guide element, said U-shaped member and the guide element having configurations holding the U-shaped member captive for sliding movement along the arcuate guide element and exposing a portion of the guide element to the bridge element, said bridge element and the U-shaped member having configurations permitting separation thereof only by relative movement therebetween in a direction substantially parallel to the web, and a clamping member mounted on the bridge member for movement towards and from said exposed portion of the guide element, whereby the loop unit may be alined with a conductor and whereby a conductor disposed in the loop unit may be clamped by the clamping member against the guide element.

5. In a connection device for a detachable instrument, a contact jaw comprising a U-shaped electroconductive member having a web and first and second legs disposed respectively in first and second substantially parallel, spaced planes, said planes being transverse substantially to said web, an arcuate guide element having a first portion connected to the web, said arcuate guide element having a second portion substantially parallel to said web extending arcuately for a substantial angular distance about the contact jaw, said second portion being spaced for a substantial distance from the contact jaw and having a free end terminating adjacent the contact jaw, and a terminal unit slidably mounted on the arcuate guide element, said terminal unit having an opening for receiving a conductor which extends in a direction at 45° relative to said planes when the terminal unit occupies an intermediate position along the guide element.

6. A connection device comprising a flat elongated electroconductive ribbon, and a clamping unit comprising a receiver cooperating with the ribbon to define a receiving space bounded in part by the electroconductive ribbon, said receiver and ribbon having engaging surfaces configured to guide the receiver in a path along the ribbon from a first operating position wherein a first part of the ribbon bounds in part the receiving space to a second operating position wherein a second part of the ribbon bounds in part the receiving space, said engaging surfaces of the receiver snugly engaging four sides of the ribbon for blocking substantial movement of the receiver relative to the ribbon in a direction other than said path, and a clamping element operable in cooperation with the receiver for reducing the receiving space, said engaging surfaces of the receiver defining a guideway for the ribbon having a minimum cross-section sufficient to clear the ribbon for movement between said positions whereby the receiver may be moved from a displaced position to a position establishing the receiving space for a conductor positioned on the ribbon and the clamping element then may be operated to clamp such conductor to the guide element, said receiver having a U-configuration embracing the electroconductive ribbon and having at least a part partially overlying the ribbon to guide the receiver in said path, said clamping element comprising a bridge removably engaging the open ends of the U-shaped receiver to complete with the receiver a loop surrounding the ribbon, said bridge and the receiver having interlocking configurations permitting releasing movement of the bridge relative to the receiver in substantially a straight-line direction substantially parallel to said ribbon and blocking substantial movement of the bridge relative to the receiver in a direction transverse to the ribbon, and a screw in threaded engagement with the bridge, said screw with the bridge in operative position being operable in a direction transverse to the ribbon from a position clear of the space between the legs of the U-shaped receiver to a position wherein a part of the screw is between said legs to prevent said releasing movement of the bridge.

7. An electrical connection device comprising a U-shaped receiver having a web and a pair of spaced, parallel legs projecting substantially in the same direction from said web, parts on each of said legs being spaced from each other and from said web to define with the web a guideway, a guide element located in the guideway in engagement with the web for constraining the receiver for movement parallel to the guide element and against movement transverse to the guide element, said parts being spaced from the plane of the web and extending from said legs whereby the guide element may be located between the web and the parts, said parts being spaced to expose at least part of the web between the open ends of the U-shaped receiver, said parts overlying the guide element to prevent movement of the guide element away from the web, and said guideway having a minimum cross-section sufficient to clear the guide element for a substantial range of sliding movement of the guide element through said guideway in a direction parallel to the plane of said web, and a constrictor comprising a bridge connecting the open ends of the U-shaped receiver, said bridge and receiver when in assembled condition having interfitting parts permitting releasing movement of the bridge relative to the receiver substantially in a direction parallel to the web and blocking substantial movement of the bridge relative to the receiver transverse to the web, and a screw in threaded engagement with the bridge, said screw in assembled condition of the device having an axis transverse to the web and being operable towards and away from the web.

8. In a socket for receiving a detachable instrument, an enclosure having a circular seat defining an opening for receiving a detachable instrument, at least three contact jaws disposed in said enclosure for receiving contact blades of a detachable instrument introduced through the opening, the contact jaws being spaced from each other angularly about an axis normal to the plane of said seat and passing through the center of said seat by integral multiples of 90°, said contact jaws having contact surfaces parallel to a common plane, each of the contact jaws having its contact surfaces at 45° relative to a line extending between the contact jaw and said axis, a separate connector element connected to and extending away from each of the contact jaws, and separate terminal means adjustably mounted on each of the connector elements independently of the contact jaws for connecting each of connector elements for the contact jaws to a conductor, each of the terminal means having an intermediate position wherein it is disposed substantially on the associated one of said lines and is alined to receive a conductor transverse to the associated one of said lines and having other operating positions displaced substantially from the associated one of said lines, each of said terminal means being adjustable relative to its associated connector element and to the socket into alinement with conductors displaced angularly in either direction from such transverse position without disturbing the associated contact jaw, each of the terminal means being revolvable about a second axis parallel to said first-named axis and spaced from the associated jaw substantially along the line passing through the center of the associated jaw and said first-named axis, each of said terminal means being spaced from its associated second axis.

References Cited in the file of this patent

UNITED STATES PATENTS

| | | |
|---|---|---|
| 1,364,419 | White | Jan. 4, 1921 |
| 1,989,893 | Taylor | Feb. 5, 1935 |
| 2,015,112 | Johansson | Sept. 24, 1935 |
| 2,071,936 | Mylius | Feb. 23, 1937 |
| 2,118,587 | Bradshaw | May 24, 1938 |
| 2,173,206 | Landmeier | Sept. 19, 1939 |
| 2,266,532 | Braunsweig | Dec. 16, 1941 |
| 2,297,833 | Johansson | Oct. 6, 1942 |
| 2,363,345 | MacGahan | Nov. 21, 1944 |
| 2,538,912 | Road et al. | Jan. 23, 1951 |
| 2,695,923 | Lajeunesse et al. | Nov. 30, 1954 |
| 2,720,636 | McKinley | Oct. 11, 1955 |